United States Patent
Snibbe et al.

(10) Patent No.: US 6,496,200 B1
(45) Date of Patent: Dec. 17, 2002

(54) FLEXIBLE VARIATION OF HAPTIC INTERFACE RESOLUTION

(75) Inventors: Scott S. Snibbe, San Francisco, CA (US); Karon E. MacLean, Palo Alto, CA (US); Kimberly H. Johnson, San Francisco, CA (US); Oliver T. Bayley, Pacifica, CA (US); William L. Verplank, Menlo Park, CA (US)

(73) Assignee: Interval Research Corp., Palo Alto, CA (US)

( * ) Notice: Subject to any disclaimer, the term of this patent is extended or adjusted under 35 U.S.C. 154(b) by 0 days.

(21) Appl. No.: 09/433,607

(22) Filed: Nov. 2, 1999

(51) Int. Cl.$^7$ .................................................. G06G 5/00
(52) U.S. Cl. ......................... 345/701; 345/702; 345/156
(58) Field of Search .............................. 345/156, 157, 345/161, 163, 167, 184, 701, 702; 707/102; 709/203

(56) References Cited

U.S. PATENT DOCUMENTS

| | | | | |
|---|---|---|---|---|
| 5,220,260 A | | 6/1993 | Schuler | 318/561 |
| 5,414,337 A | | 5/1995 | Schuler | 318/561 |
| 5,559,412 A | | 9/1996 | Schuler | 318/561 |
| 6,046,726 A | * | 4/2000 | Keyson | 345/156 |
| 6,084,587 A | * | 7/2000 | Tarr et al. | 345/419 |
| 6,131,097 A | * | 10/2000 | Peurach et al. | 707/102 |
| 6,147,674 A | * | 11/2000 | Rosenberg et al. | 345/157 |
| 6,161,126 A | * | 12/2000 | Wies et al. | 709/203 |
| 6,169,540 B1 | * | 1/2001 | Rosenberg et al. | 345/701 |
| 6,285,351 B1 | * | 9/2001 | Chang et al. | 345/156 |
| 6,292,170 B1 | * | 9/2001 | Cnang et al. | 345/156 |
| 6,300,936 B1 | * | 10/2001 | Braum et al. | 345/156 |

* cited by examiner

Primary Examiner—Steven Saras
Assistant Examiner—Paul A. Bell
(74) Attorney, Agent, or Firm—Van Pelt & Yi LLP

(57) ABSTRACT

A haptic interface device produces a haptic display in response to a user's interaction with an environment with which the haptic interface device is associated. The invention enables the resolution of the haptic display produced by the haptic interface device to be changed by the user. In particular, the invention can be implemented so that the haptic display resolution can be changed (readily) as the user interacts with the environment using the haptic interface device. Thus, the invention can enable a user to interact with a particular environment at different levels of detail (i.e., different resolutions) and, in particular, can enable the user to immediately change from interacting with the environment at one level of detail to interacting with the environment at a different level of detail. The invention can also enable a user to change the resolution of the haptic display of a haptic interface device by interacting with the haptic interface device and/or an apparatus used by the user to interact with the environment, thus facilitating the ability of the user to change the resolution of the haptic display while simultaneously interacting with the environment and thereby enabling the user to change quickly between different levels of haptic display detail. Additionally, the invention can enable a user to effect continuous change in the resolution of the haptic display of a haptic interface device, thus enabling the user to interact with the environment at any desired level of haptic display detail.

35 Claims, 3 Drawing Sheets

FLEXIBLE VARIATION OF HAPTIC INTERFACE RESOLUTION

BACKGROUND OF THE INVENTION

1. Field of the Invention

This invention relates to haptic interfaces and, in particular, to varying the resolution of the haptic display of a haptic interface device.

2. Related Art

A "haptic interface device" provides a haptic sensation (haptic display) to a user of the haptic interface device in response to the user's interaction with an environment with which the haptic interface device is associated. "Haptic" refers to the sense of touch: haptic interface display devices thus produce sensations associated with the sense of touch, such as texture, force (e.g., frictional force, magnetic repulsion or attraction), vibration, mass, density, viscosity, temperature, moisture, or some combination of such sensations. Haptic interface devices can be embodied in a variety of different apparatus, such as, for example, apparatus for conveying force and/or vibrotactile sensation (e.g., a stylus, a movable arm, a wheel, a dial, a roller, a slider or a vibratory surface), apparatus for conveying thermal sensation (e.g., a thermally-controlled surface or air volume), and apparatus for conveying the sensation of moisture (e.g., a moisture-controlled surface or air volume). Haptic interface devices can be used in a wide variety of applications. For example, some joysticks and mice used with computers incorporate force feedback to provide a haptic display to a user of the joystick or mouse. Some paging devices are adapted to vibrate when a paging signal is received. Some toys produce vibrations as part of the interaction with the toy. These examples give an indication of the range of applications for which a haptic interface device can be used.

In a conventional haptic interface device, the character of the haptic display experienced by a user is determined by a haptic model that links the state of one or more aspects of the environment to the haptic sensation provided to the user. This is illustrated in FIG. 1. A user 101 uses an environment interaction control apparatus 103 to interact with an environment 102 via an environment interaction model 104 (either directly or via a haptic model 106, as indicated in FIG. 1 by the dashed lines between the environment interaction model 104 and the environment 102, and the environment interaction model 104 and the haptic model 106). The haptic model 106 "interprets" the user interaction with the environment 102 (based on information concerning the user interaction obtained either from the environment interaction model 104 or the environment 102, as indicated in FIG. 1 by the dashed line between the environment interaction model 104 and the haptic model 106 and the dashed arrow head entering the haptic model 106 from the environment 102) to cause a haptic display apparatus 105 to produce a corresponding haptic display. The environment interaction model 104 can also cause a non-haptic display apparatus 107 to produce a non-haptic display (e.g., a visual display and/or an audio display). However, there need not necessarily be a non-haptic display (as indicated by the dashed lines between the non-haptic display apparatus 107 and the environment interaction model 104 and user 101).

The magnitude of the change in haptic sensation per unit change in the state of one or more aspects of the environment is referred to herein as the "resolution" of the haptic display. For example, in a haptic interface device used for video browsing and/or editing, a knob can be rotated to advance through the frames of a video recording, a force being applied in opposition to rotation of the knob, to simulate a detent, at predetermined transitions from one video frame to the next in the video recording. The resolution of the haptic display in that haptic interface device can be the frequency of occurrence of detents in the video recording (e.g., the number of video frames between each detent). (It can also be possible, as illustrated by an example discussed further below, to define the resolution of the haptic display of such a haptic interface device in terms of the frequency of detents per unit duration of time over which the video was obtained.)

In previous haptic interface devices, the resolution of the haptic display cannot be changed by a user of the haptic interface device. (As explained further below, a "creator" of the haptic interface device may change the resolution of the haptic display.) In particular, a user of a haptic interface device has not been able to change the resolution of the haptic display during use of the haptic interface device. For example, in the above-described haptic interface device used for video browsing and/or editing, the resolution of the haptic display remains constant during use of the haptic interface device by a user: a given amount of rotation of the knob always advances the video recording through the same number of video frames and passes through the same number of detents.

Herein, a "user" of a haptic interface device is a person who engages in use of the haptic interface device for the intended purpose of the haptic interface device. A "creator" of a haptic interface device is a person who constructs some part or all of a haptic interface device (i.e., one or more of the models and/or apparatus of the haptic interface device as shown in FIG. 1) and thereby establishes the characteristics (e.g., haptic display resolution) of the haptic interface device. Thus, as used herein, a "creator" of a haptic interface device is not a "user" of the haptic interface device, though the same person can act, at different times, in both capacities. As indicated above, a creator of a haptic interface device can change the resolution of the haptic display of a haptic interface device. This can be done by appropriately modifying one or more of the models and/or apparatus of the haptic interface device to produce a desired haptic display resolution. For example, a video browsing and/or editing haptic interface device as described above has been implemented so that the number of detents per complete revolution of the knob is established, prior to use of the haptic interface device by a user, based upon the nature of the video recording (e.g., 30 detents per revolution for a video recording acquired at 30 frames per second and 24 detents per revolution for a video recording acquired at 24 frames per second). (Such a haptic interface device is an example of a haptic interface device for which the resolution of the haptic display is defined in terms of the frequency of detents per unit duration of time over which the video was obtained, as opposed to frequency of detents per video frames of the recording.)

Current haptic interface devices do not enable a user of the haptic interface device to change the resolution of the haptic display and, in particular, do not enable the user to change the resolution of the haptic display during interaction with the environment. Further, a user of a haptic interface device has not been able to change the resolution of the haptic display using an apparatus through which some or all of the haptic display is provided to the user. Additionally, current haptic interface devices do not enable continuous change in the resolution of the haptic display. Thus, the user's flexibility in interacting with the environment is inhibited when using a current haptic interface device.

SUMMARY OF THE INVENTION

A haptic interface device produces a haptic display in response to a user's interaction with an environment with which the haptic interface device is associated. According to the invention, the resolution of the haptic display produced by the haptic interface device can be changed by the user. In particular, the invention can be implemented so that the haptic display resolution can be changed as the user interacts with the environment using the haptic interface device. Thus, the invention can enable a user to interact with a particular environment at different levels of detail (i.e., different resolutions) and, in particular, can enable the user to immediately change from interacting with the environment at one level of detail to interacting with the environment at a different level of detail. For example, the user can switch back and forth between interacting with the environment at a relatively coarse level of detail that gives an overall sense of the environment and interacting with the environment at a relatively fine level of detail that enables the user to obtain a more precise sense of a particular aspect of the environment.

The invention can also enable a user to change the resolution of the haptic display of a haptic interface device by interacting with haptic display apparatus (i.e., apparatus that provides some or all of the haptic display to the user) and/or environment control apparatus (i.e., apparatus used by the user to interact with the environment) of the haptic interface device. This capability greatly facilitates the ability of the user to change the resolution of the haptic display while simultaneously interacting with the environment. In particular, such capability enables the user to change quickly between different levels of haptic display detail.

The invention can also enable a user to effect continuous change in the resolution of the haptic display of a haptic interface device. The ability to continuously change the resolution of the haptic display enables the user to interact with the environment at any desired level of haptic display detail.

The invention can enable each of the haptic display, the user interaction with the environment, and the resolution control to be effected with one or more degrees of freedom. Further, the invention can enable each of the haptic display, the user interaction with the environment, and the resolution control to be effected by a translational or rotational input or output (as appropriate). (Other types of input or output can also be used if appropriate or desired.)

DETAILED DESCRIPTION OF THE INVENTION

Figure 1:
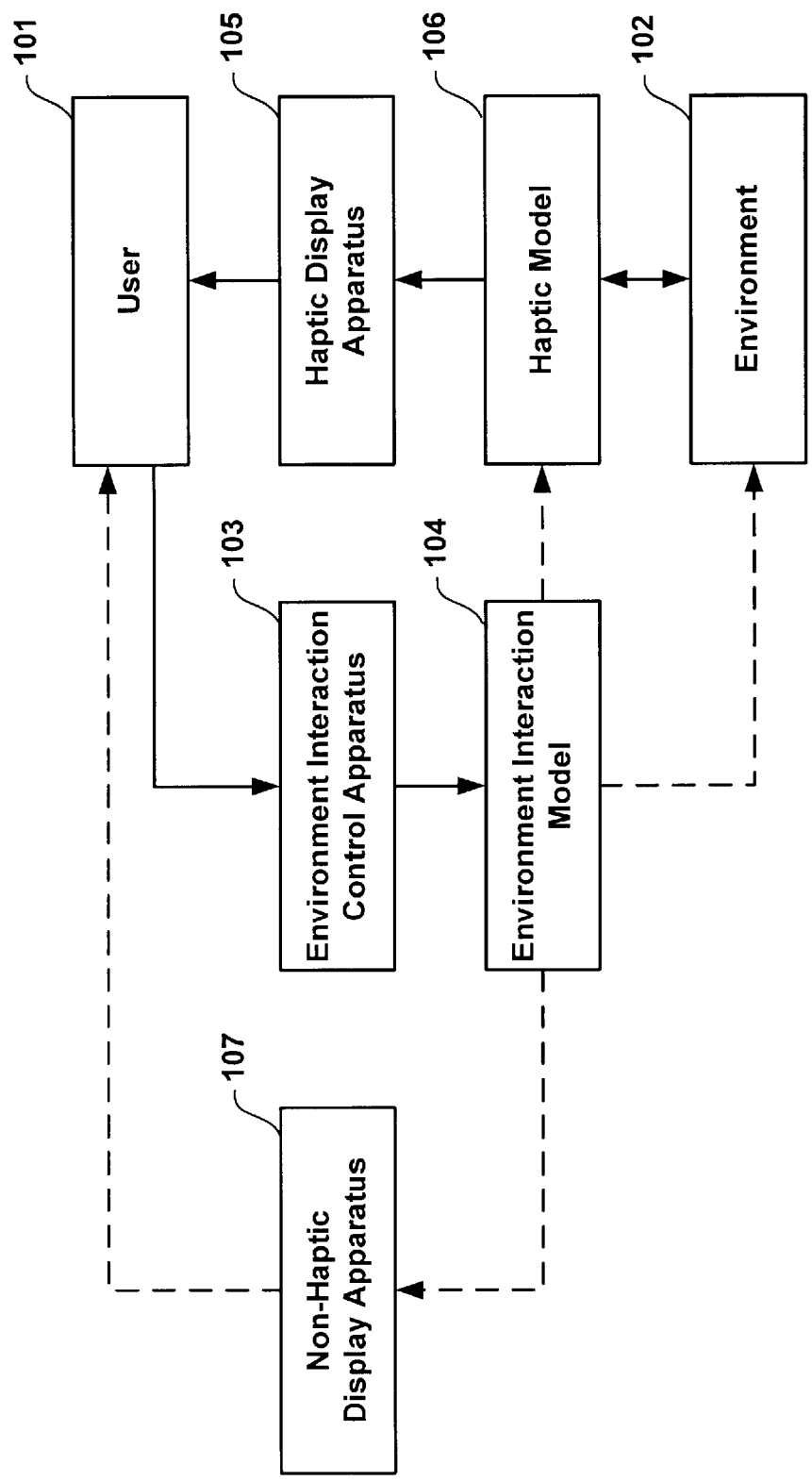
FIG. 1 is a block diagram of the functional components of a conventional haptic interface device.
Figure 2:
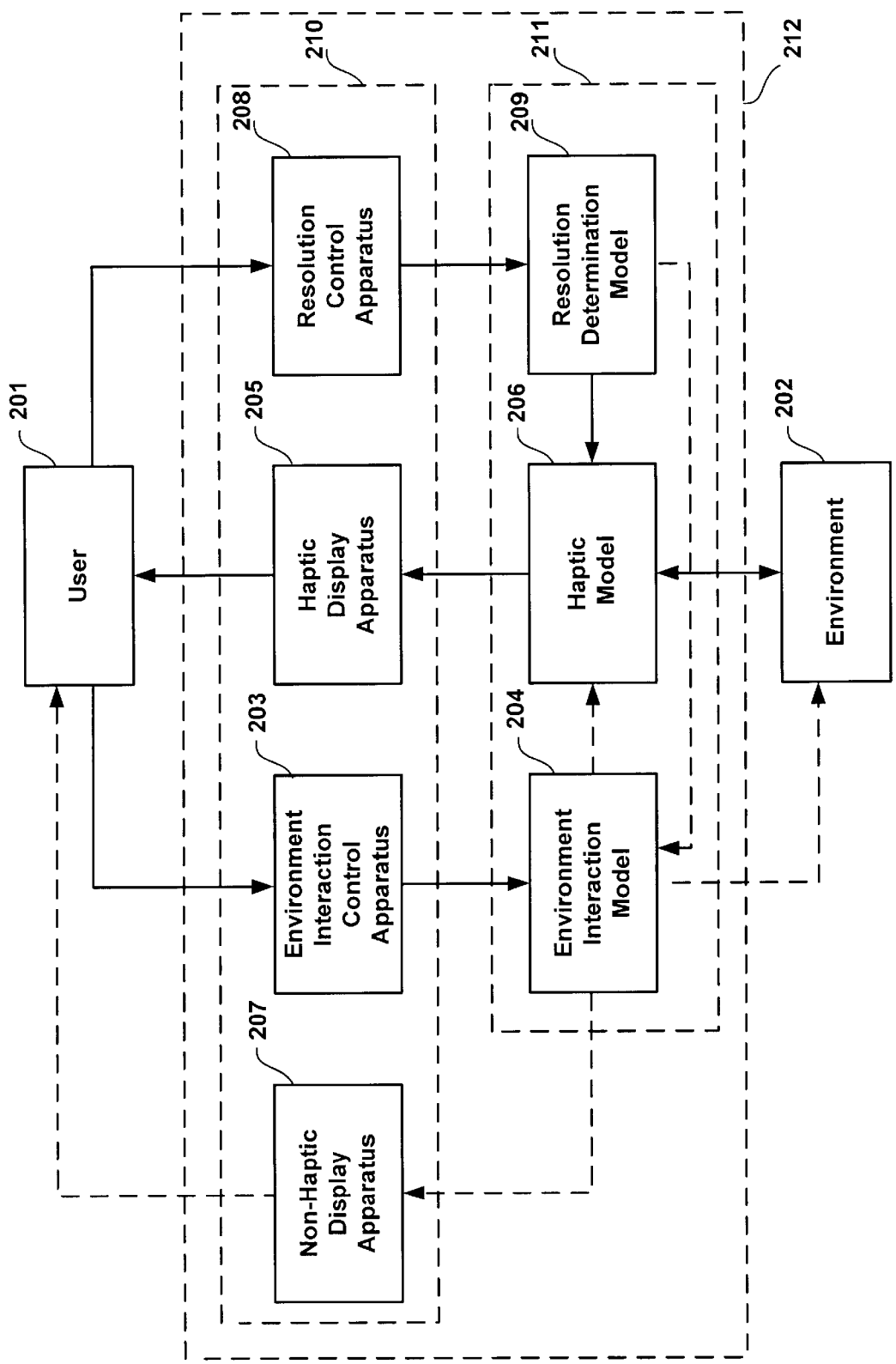
FIG. 2 is a block diagram of the functional components of a haptic interface device according to the invention.

FIG. 2 is a block diagram of the functional components of a haptic interface device 212 according to the invention. A user 201 interacts with an environment 202 using the haptic interface device 212. (What can constitute the environment 202 and the types of interaction that the user 201 can have with the environment 202—which typically will depend upon the nature of the environment 202—are discussed further below.) The haptic interface device 212 includes user input/output apparatus 210 and user interaction model 211.

The user input/output apparatus 210 is tangible apparatus with which the user 201 can physically interact (e.g., using the sense of touch, sight, hearing, smell and/or taste) to provide input to the haptic interface device 212. The user input/output apparatus 210 includes an environment interaction control apparatus 203, a haptic display apparatus 205 and a resolution control apparatus 208. The user input/output apparatus 210 can also, but need not necessarily (as indicated by the dashed lines between the non-haptic display apparatus 207 and the environment interaction model 204 and user 201), include a non-haptic display apparatus 207. It is to be understood, as discussed further below, that two or more of the environment interaction control apparatus 203, haptic display apparatus 205, resolution control apparatus 208 and non-haptic display apparatus 207 can be embodied in the same device. The environment interaction control apparatus 203, haptic display apparatus 205, resolution control apparatus 208 and non-haptic display apparatus 207 are separately illustrated in the drawings and discussed herein to clearly identify, and facilitate discussion of, the different functional components of the user input/output apparatus 210.

The user interaction model 211 mediates user input to, and output from, the environment 202. The user 201 cannot interact directly with the user interaction model 211. Often, the user interaction model 211 is embodied by one or more computer programs executing on a computational device. (However, the user interaction model 211 can be embodied in other ways, e.g., tangible physical apparatus such as mechanical linkages.) The user interaction model 211 includes an environment interaction model 204, a haptic model 206 and a resolution determination model 209. It is to be understood, as more readily apparent from the description below, that one or more of the environment interaction model 204, haptic model 206 and resolution determination model 209 can be embodied in the same physical apparatus or as part of the same computer program. The environment interaction model 204, haptic model 206 and resolution determination model 209 are separately illustrated in the drawings and discussed herein to clearly identify, and facilitate discussion of, the different functional components of the user interaction model 211.

The haptic interface device 212 is used and operates as follows. A user 201 engages in an input interaction (e.g., browsing, editing, manipulating, controlling, annotating, marking, navigating, deforming, arranging) with the environment 202 using the environment interaction control apparatus 203. The nature of the input interaction with the environment 202 is determined in accordance with the environment interaction model 204. (The environment interaction model 204 can communicate input from the user 201 to the environment 202 either directly or via the haptic model 206, as indicated in FIG. 2 by the dashed line between the environment interaction model 204 and the environment 202, and the dashed line between the environment interaction model 204 and the haptic model 206.) Based on the interaction by the user 201 with the environment 202, a haptic display is produced in accordance with the haptic model 206 and provided to the user 201 by the haptic display apparatus 205. (The haptic model 206 can produce the haptic display based on information concerning the user interaction obtained either from the environment interaction model 204 or the environment 202, as indicated in FIG. 2 by the dashed line between the environment interaction model 204 and the haptic model 206 and the dashed arrow head entering the haptic model 206 from the environment 202.) If present, the non-haptic display apparatus 207 can also produce a non-haptic display (e.g., a visual display and/or an audio display) based on the user interaction with the environment 202. At any given time, the haptic display has associated therewith a "resolution" (i.e., magnitude of the change in haptic sensation per unit change in the state of one or more aspects of the environment). The user 201 can use a resolution control apparatus 208 to establish (and, in particular, to effect changes to) the resolution of at least part of the haptic display. In particular, the haptic interface device 212 can be implemented so that the user 201 can establish or change the haptic display resolution during interaction with the environment 202. (Of course, the resolution control apparatus 208 may be used to establish the resolution of all of the haptic display, depending upon the implementation of the haptic interface device 212 and/or the input from the user 201.) The resolution is determined in accordance with a resolution determination model 209, based on input by the user 201 to the resolution control apparatus 208. In a particularly advantageous embodiment of the invention, the user 201 can effect continuous change in the resolution of at least part of the haptic display. The invention can—and, it is anticipated, typically will—be implemented so that, in addition to controlling the resolution of the haptic display, user input to the resolution control apparatus 208 also controls the resolution of the non-haptic display. (However, as indicated in FIG. 2 by the dashed line between the resolution determination model 209 and the environment interaction model 204, this need not necessarily be the case.)

The ability of the user to change the resolution of the haptic display (and, in particular, to change the resolution of the haptic display during interaction with the environment 202) enables the user 201 to interact with the environment 202 at different levels of detail (i.e., different resolutions) and, in particular, enables the user to immediately change from interacting with the environment at one level of detail to interacting with the environment at a different level of detail. For example, the invention can be implemented so that the user 201 can change between a relatively coarsely detailed interaction with the environment 202 and a relatively finely detailed interaction with the environment 202. Thus, the user 201 can switch back and forth between interacting with the environment 202 at a relatively coarse level of detail that gives an overall sense of the environment 202 and interacting with the environment 202 at a relatively fine level of detail that enables the user 201 to obtain a more precise sense of a particular aspect of the environment 202. This may be useful, for example, in browsing and/or editing a visual and/or audio recording. This may also be useful, for example, when the user 201 is interacting with an environment 202 in which parts of the environment 202 of interest—which each produce a haptic sensation when encountered by the user 201—are sparsely located within the environment 202, since the user 201 can interact the environment 202 at a coarse level of detail until a part of the environment 202 of interest is found (thus enabling the interesting parts of the environment 202 to be rapidly located), then quickly switch to interacting with an interesting part of the environment 202 at a fine level of detail (thus enabling a more deliberate interaction with the interesting parts of the environment 202).

Further, if the invention is implemented so that the resolution control apparatus 208 and either or both of the haptic display apparatus 205 and the environment interaction control apparatus 203 are implemented in the same apparatus, the ability of the user 201 to change the resolution of the haptic display while simultaneously interacting with the environment 202 is greatly facilitated. In particular, such an implementation facilitates the ability of the user 201 to change quickly between different levels of detail of interaction with the environment 202.

Additionally, implementing the resolution control apparatus 208 and resolution determination model 209 to enable continuous change in the resolution of the haptic display enables the user 201 to interact with the environment 202 at any desired level of detail, i.e., gives the user 201 complete control over the selection of haptic display resolution (within the limits of minimum resolution and maximum resolution established by the construction of the haptic interface device 212). Continuous change of the haptic display resolution can also be desirable for many applications of the invention because seamless transition between different haptic display resolutions can produce a cognitively pleasing effect. However, while the ability to continuously change haptic display resolution can be, in general, an advantageous characteristic of the invention, for some applications of the invention, it can be desirable to implement the invention so that any of multiple discrete haptic display resolutions can be selected by the user 201. Such an implementation can enable the user 201 to precisely select a particular resolution (of predetermined magnitude) while bearing a smaller cognitive load than would be incurred if the user 201 had to carefully control the resolution control apparatus 208 to hone in on such resolution. Such an implementation can be desirable, for example, for use in applications in which it is desired to repetitively select the same resolution(s) for viewing parts of the environment 202.

As used herein, "environment" refers generally to anything that can be perceived by a user and with which the user can interact in a manner that enables a haptic sensation to be provided to the user to represent the state of one or more aspects of the environment. An environment can be embodied by an apparatus and/or a representation (e.g., an image, sound or smell) produced by an apparatus (e.g., a computational device operating in accordance with one or more computer programs). For example, an environment can be a visual and/or an audio recording, a spreadsheet, a still photographic image, a graphic representation of object(s) or scenes(s) by a computational device and associated display device (e.g., a map, a video game, a graphic representation of a molecular structure, a graphic representation of a mechanical linkage), a vehicle control system (e.g., a passenger compartment climate control system), a home appliance (e.g., oven, telephone, toaster, radio, stereo, lights, television), or an industrial tool (e.g., factory machines, nuclear power plant components). The foregoing list gives an indication of the wide variety of apparatus and representations that can constitute an "environment," and the variety of applications with which a haptic interface device in accordance with the invention can be used.

The environment interaction model 204 relates the state of one or more user inputs to the environment interaction control apparatus 203 to the state of the environment 202. The environment interaction model 204 is typically embodied by software and/or firmware that represents one or more mathematical relationships that produce the desired environment interaction control capability. Those skilled in the art can implement an environment interaction model 204 for a particular environment 202, environment interaction control apparatus 203 and specified inputs to and outputs from the environment interaction model 204, as described elsewhere herein.

Environment interaction control (i.e., input to the environment interaction model 204) can be effected in any appropriate manner, such as, for example, by sensing force or pressure applied to the environment interaction control apparatus 203, touching of a surface of the environment interaction control apparatus 203, position (or higher order derivatives thereof, such as velocity, acceleration and jerk) of some part or all of the environment interaction control apparatus 203, sound (e.g., sound volume, spoken instruction) emitted by the user 201 or an audio device, movement of a part of the body (e.g., facial or arm movements) of the user 201, or some combination of such inputs. A variety of conventional devices (e.g., sensors and, if applicable, associated processing devices) can be used for this purpose. Since it is anticipated that the invention will often be implemented in relatively small apparatus, it is desirable that the environment interaction control sensor(s) be relatively small devices (e.g., strain gauge(s), force sensitive resistor(s), Hall-effect sensor(s), optical displacement sensor(s)).

The output from the environment interaction model 204 establishes the state of the environment 202. For example, when the environment 202 is a visual and/or an audio recording, the environment interaction model 204 identifies a frame of the visual recording and/or audio sample(s) of the audio recording that correspond to the user input to the environment interaction control apparatus 203. The changes in the environment 202 that result from changes in user input to the environment interaction control apparatus 203 will typically depend upon the nature of the environment 202. For example, the user 201 could use the environment interaction control apparatus 203 to move through the frames of a visual and/or audio recording. Or, for example, the user 201 could use the environment interaction control apparatus 203 to change temperature in the passenger compartment of a vehicle. The user 201 could use the environment interaction control apparatus 203 to move control rods in a nuclear reactor. Or, the user 201 could use the environment interaction control apparatus 203 to change the volume of a radio or stereo. Other possibilities are readily apparent from the description of the invention elsewhere herein (e.g., examples of an "environment").

Depending upon the nature of the environment 202 and the implementation of the haptic interface 212, the output from the environment interaction model 204 can also cause the production of a non-haptic display by the non-haptic display apparatus 207. For example, when the environment 202 is a visual and/or an audio recording, the non-haptic display apparatus 207 can display frame(s) of the visual recording and/or audio sample(s) of the audio recording. If the environment 202 is a climate control system for a vehicle passenger compartment, the non-haptic display apparatus can display a temperature setting for the passenger compartment. If the environment 202 is the control rods in a nuclear reactor, the non-haptic display apparatus can display the position of the control rods.

The haptic model 206 relates the state of one or more aspects of the environment 202 to output (haptic sensation) produced by the haptic display apparatus 205. The haptic model 206 is typically embodied by software and/or firmware that represents one or more mathematical relationships that produce the desired haptic display. Those skilled in the art can implement a haptic model 206 for a particular environment 202, haptic display apparatus 205 and specified inputs to and outputs from the haptic model 206, as described elsewhere herein.

Though, in FIG. 2, a single haptic model 206 is depicted, it is to be understood that a haptic interface device according to the invention (or a system including a haptic interface device according to the invention) can be implemented with multiple haptic models. The invention can be implemented so that selection of which haptic model is used to produce a haptic display at any particular time is made by the user or occurs automatically in accordance with one or more predetermined criteria concerning operation of the haptic interface device or system. Additionally, the invention can be implemented so that the resolution of at least part of one, some or all of the haptic models can be changed in response to appropriate user input.

The aspect(s) of the environment 202 on which the haptic output depends (i.e., the input to the haptic model 206) can—and often will—depend on the nature of the environment 202. For example, if the environment 202 is a visual and/or an audio recording, the input to the haptic model 206 can relate to which part of the recording is currently being displayed (e.g., whether a video frame—or other related set of visual recording data—is being displayed or a transition between video frames is occurring). Or, for example, if the environment 202 is a spreadsheet, the input to the haptic model 206 can be the value(s) of quantit(ies) in the spreadsheet. If the environment 202 is an automobile climate control system, the input to the haptic model 206 can be the temperature setting for the passenger compartment of a vehicle. Or, if the environment 202 is a radio or stereo, the input to the haptic model 206 can be the volume setting for the radio or stereo.

Output produced by the haptic display apparatus 205 can include, for example, sensations of texture, force (e.g., frictional force, magnetic repulsion or attraction), vibration, mass, density, viscosity, temperature, moisture, or some combination of such sensations. When the environment 202 is a visual and/or an audio recording, for example, force can be applied in opposition to movement of an apparatus embodying the environment interaction control apparatus 203 and the haptic display apparatus 205 to simulate a detent as transition is made from one video frame (or other related set of visual recording data) to the next. Additionally, as known to those skilled in the art, the haptic model 206 can replicate a variety of characteristics of a haptic sensation, such as inertia, damping and/or compliance. The haptic display apparatus 205 can make use of a variety of devices to produce the haptic display. For example, if appropriate for the desired haptic display, devices for producing force and/or vibrotactile sensation can be used, such as, for example, DC servo motor(s), voice coil motor(s), linear actuator(s), hydraulic actuator(s), pneumatic actuator(s), shape memory alloy(s) (SMAs) and piezoelectric transducer(s). If appropriate for the desired haptic display, thermal devices can additionally or alternatively be used, such as, for example, thermoelectric module(s), or heater and fan combination(s). If appropriate for the desired haptic display, moisture devices and/or materials can additionally or alternatively be used, such as, for example, condenser(s), mister(s), moisture-permeable barrier(s) and anhydrous material(s).

As indicated above, the resolution of the haptic display is determined in accordance with the resolution determination model 209, based on user input to the resolution control apparatus 206. In general, a desired resolution determination model 209 can readily be implemented by one of skill in the art. For example, when input to the resolution control apparatus 206 is force or pressure applied to the resolution control apparatus 206 by the user 201, the sensed force or pressure can be related to a corresponding haptic resolution using a linear or non-linear relationship (e.g., doubling the applied force may result in a doubling of the haptic display resolution). (The sensed force or pressure can be related to a corresponding resolution of a non-haptic display in a similar manner.) Like the haptic model 206, the resolution determination model 209 typically is embodied by software and/or firmware that represents one or more mathematical relationships that produce the desired haptic resolution.

Resolution control (i.e., input to the resolution determination model 209) can be effected in any appropriate manner, such as, for example, by sensing force or pressure applied to the resolution control apparatus 208, touching of a surface of the resolution control apparatus 208, position (or higher order derivatives thereof, such as velocity, acceleration and jerk) of some part or all of the resolution control apparatus 208, sound (e.g., sound volume, spoken instruction) emitted by the user 201 or an audio device, movement of a part of the body (e.g., facial or arm movements) of the user 201, or some combination of such inputs. A variety of conventional devices (e.g., sensors and, if applicable, associated processing devices) can be used for this purpose. Since it is anticipated that the invention will often be implemented in relatively small apparatus, it is desirable that the resolution control sensor(s) be relatively small devices (e.g., strain gauge(s), force sensitive resistor(s), Hall-effect sensor(s), optical displacement sensor(s)). Further, if the invention is implemented so that the resolution of the haptic display can be changed continuously, sensors that can sense continuous changes in the sensed quantity are desirable (though discrete sensors can also be used, interpolation between discrete sensed resolution control inputs being used to produce continuous resolution control). Resolution control can also be effected using a keyboard, mouse, or other conventional computer input and/or switching device to select a resolution from a set of multiple possible resolutions, which can be displayed to a user in any appropriate manner, such as a graphical menu display or other GUI display mechanism.

Figure 3:
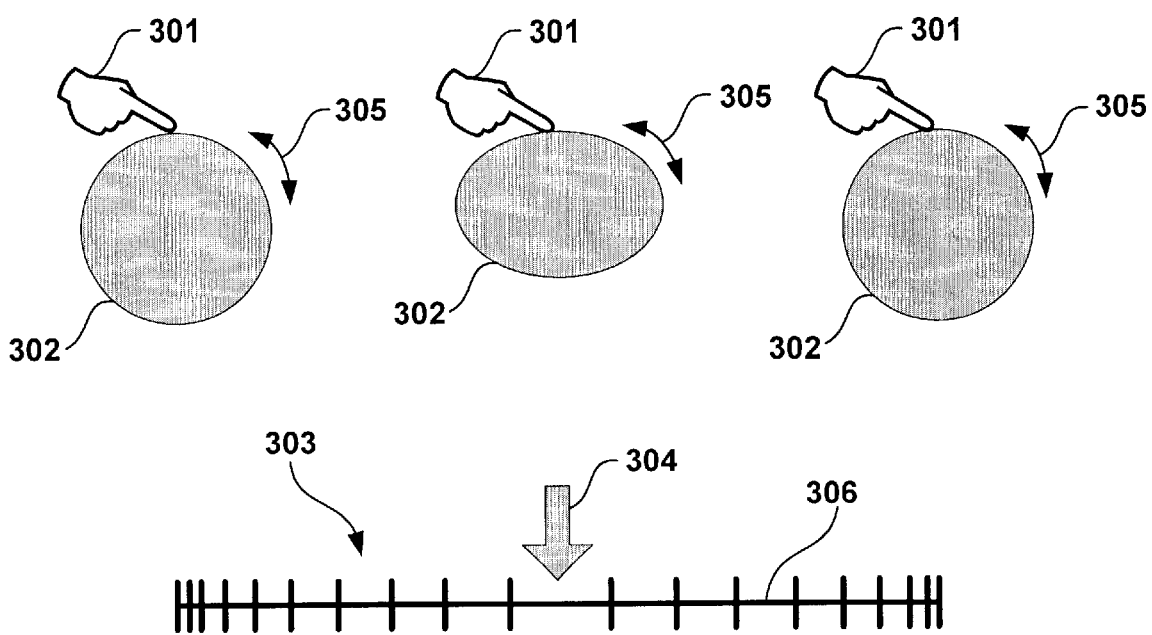
FIG. 3 is an illustration of a virtual representation of one embodiment of a haptic interface device in accordance with the invention, illustrating operation of the functional components of the haptic interface device.

In some embodiments of the invention, resolution control and environment interaction control are effected (at least in part) by sensing force and/or position (or higher order derivatives), and the haptic display is effected (at least in part) by providing a force. In such embodiments, it can be desirable to sense the resolution control input along an axis that is different than (e.g., orthogonal to) that along which the environment interaction control input is sensed and/or the haptic display output is provided, so that the user 201 perceives interaction with a haptic interface device having an additional degree of freedom. (This is shown in FIG. 3, described below, in which resolution control is effected by applying a downward force to the user control device 302 in a direction that is substantially orthogonal to a rotational axis 305 along which environment control is effected and haptic display is provided.) This is desirable, in particular, because the additional degree of freedom is provided using an input device (sensor) rather than an output device (actuator), the latter typically being more expensive than the former.

Changes in haptic resolution result in changes in the magnitude of the changes in sensation of texture, force (e.g., frictional force, magnetic repulsion or attraction), vibration, mass, density, viscosity, temperature, and/or other haptic sensation that are perceived by the user 201 per unit change in the state of one or more aspects of the environment. As indicated above, a system in accordance with the invention can also be implemented so that changes in haptic resolution result in corresponding changes in the resolution with which the environment interaction control apparatus 203 causes changes in the environment and/or, if present, the resolution of the non-haptic display. FIG. 3, discussed below, illustrates an example of such an embodiment. The haptic resolution can be changed throughout all of the haptic display or only a part. Further, the resolution of different parts of the haptic display can be changed by different amounts.

The environment interaction control apparatus 203, the haptic display apparatus 205, the resolution control apparatus 208 and the non-haptic display apparatus 207 can be embodied by any appropriate device or devices (e.g., devices that sense the exemplary inputs to, or produce the exemplary outputs from, the corresponding models, discussed above), a variety of which are known to those skilled in the art. For example, the resolution control apparatus 208 can be embodied by a squeezable bulb or handle, a force or motion-sensitive handle or arm, a capacitive touch sensing device, or a speech recognition system. The environment interaction control apparatus 203 can be embodied by, for example, a rotatable wheel or knob, a force or motion-sensitive handle or arm, a speech recognition system, or a computer-vision system that monitors head or eye movement. The haptic display apparatus 205 can be embodied by, for example, a force-actuated wheel, knob, handle or arm, a heat sourcing and/or sinking device, or a moisture generating and/or absorbing device. The non-haptic display apparatus 207 can be embodied by, for example, a computer display device, a television, a stereo or a radio. The foregoing are intended only to be illustrative; there are many other devices that can be used to embody the environment interaction control apparatus 203, the haptic display apparatus 205, the resolution control apparatus 208 and the non-haptic display apparatus 207.

It may be necessary or desirable for two or more of the environment interaction control apparatus 203, the haptic display apparatus 205, the resolution control apparatus 208 and the non-haptic display apparatus 207 to be embodied in the same device. (However, this need not be the case; in fact, multiple devices can be used to implement any one of the environment interaction control apparatus 203, the haptic display apparatus 205, the resolution control apparatus 208 or the non-haptic display apparatus 207.) FIG. 3 (discussed below) illustrates an embodiment of a haptic interface device in accordance with the invention in which all three of the environment interaction control apparatus 203, the haptic display apparatus 205, and the resolution control apparatus 208 are embodied in the same device. A Phantom™ device (known to those skilled in the art of haptic interface devices), modified (via software or hardware) to include resolution control in accordance with the invention, is another example of a single device that can embody the environment interaction control apparatus 203, the haptic display apparatus 205, and the resolution control apparatus 208 of a haptic interface device according to the invention.

FIG. 3 is an illustration of a virtual representation of one embodiment of a haptic interface device in accordance with the invention, illustrating operation of the functional components of the haptic interface device. In the embodiment illustrated in FIG. 3, resolution control is effected using a single degree of freedom translational input, environment interaction control is effected using a single degree of freedom rotational input, and haptic display is produced using a single degree of freedom translational output.

A user control device 302 enables a user 301 to interact with an environment, provides a haptic display to the user 301, and enables the user 301 to change the resolution of the haptic display. The user control device 302 can be rotated back and forth along a rotational axis 305 (represented by the bi-directional arrows in FIG. 3) to effect corresponding changes in the environment (which are represented as different positions along the horizontal axis 306). The user control device 302 can be, for example, a rotatable wheel that is used to move through the visual recording data (e.g., video frames) of a visual (e.g., video) recording.

A haptic model is used to cause the production of haptic sensations 303 in response to interaction by the user 301 with the environment. (A non-haptic display can also be produced in response to interaction by the user 301 with the environment.) The haptic sensations 303 have an associated resolution (i.e., magnitude of the change in haptic sensation per unit change in the state of one or more aspects of the environment). In FIG. 3, each different perceptible haptic sensation 303 is represented by a vertical line; the spacing between lines represents the resolution (smaller spacing between the lines represents coarser resolution, i.e., larger magnitude of the change in haptic sensation per unit change in the state of one or more aspects of the environment). The haptic sensations 303 can be, for example, detents simulated by periodically applying a force in opposition to movement of the user control device 302. Either rotational or translational force actuators can be used to simulate detents, using methods and apparatus known to those skilled in the art. For example, in a video recording display application, as the user 301 uses the user control device 302 to move through the frames of a video recording, a detent is felt by the user 301 as transition is made from one video frame to the next.

In FIG. 3, interaction by the user 301 with the user control device 302 is shown at three states of (e.g., location within) the environment. In the state shown in the middle of the axis 306, the user 301 has imparted a downward (as depicted in FIG. 3) translational force and/or motion to the user control device 302. The user control device 302 includes one or more devices for measuring the applied force and/or the change in position from a reference position. The resolution of the haptic display (e.g., the spacing between detents, which can represent either the number of video frames between detents or the amount of movement of the user control device 302 between detents) changes in accordance with changes in the measured force and/or position. Typically, the resolution with which the user 301 interacts with the environment (e.g., moves through the frames of a video recording) and the resolution of any non-haptic display (e.g., the display of frames of a video recording) also changes in accordance with changes in the measured force and/or position. As depicted in FIG. 3, the haptic display resolution increases (e.g., the spacing between detents increases) with increases in the applied force or change in position from the reference position. At the states shown at the extreme right and extreme left of the axis 306, the user 301 has not imparted a downward translational force and/or motion to the user control device 302. The resolution at these environment states is at a minimum. As illustrated in FIG. 3, as the user 301 uses the user control device 302 to move from the state at either the extreme right or extreme left of the axis 306 to the state at the middle of the axis 306, the user 301 gradually increases the applied downward translational force and/or motion to the user control device 302, correspondingly gradually increasing the haptic display resolution (as shown by the increasing spacing between the haptic sensations 303). In a video recording display application, the capability of changing the resolution of the haptic display with the user control device 302 that is also used to move through the frames of the video recording facilitates the user's ability to quickly browse through the video recording, yet quickly zero in on a specific part (e.g., one or several video frames) of the recording that is of particular interest.

In the embodiment of the invention described above with respect to FIG. 3, resolution control and environment interaction control are effected using translational input and rotational input (e.g., position and/or force), respectively, and haptic display can be produced using rotational or translational output (e.g., force). In other embodiments of the invention, resolution control can be effected using rotational input and environment interaction control can be effected using translational input. Further, in still other embodiments of the invention, in which input is effected other than through sensing force or position and/or output is effected other than through producing force, such control and display can be effected other than by rotational or translational input or output.

Additionally, in the embodiment of the invention described above with respect to FIG. 3, environment interaction control and resolution control are effected by a single degree of freedom input, and haptic display is effected by a single degree of freedom output. However, generally, environment interaction control, resolution control and haptic display can be effected by an input or output (as appropriate) having any number of degrees of freedom (e.g., an input or output along one or more of three orthogonal translational axes and/or one or more of three rotational axes), as will be more readily apparent from the description of particular applications of the invention below. Further, generally, each of the environment interaction control, clutch control and haptic display can be effected using an input or output (as appropriate) having a number of degrees of freedom that is the same as, or different than, the number of degrees of freedom of the input or output (as appropriate) with which one or both of the other of the environment interaction control, clutch control and haptic display are effected.

A haptic interface device in accordance with the invention can be used in a variety of applications, such as, for example, editing and/or browsing of visual and/or audio recordings (including professional and consumer devices), remote access to voicemail or other media, scientific visualization, computer graphics, computer aided design, and vehicle (e.g., automobile) controls. Below, several examples of particular applications of the invention are discussed in more detail to illustrate the diversity of applications for which the invention can be used.

A haptic interface device in accordance with the invention can be used to interact with a "painting" or "drawing" computer program. A user moves a haptic interface device over a surface (for convenience, referred to hereinafter as the "drawing surface") that represents a space within which a painting or drawing (for convenience, referred to hereinafter as the "image") is being, or has been, produced. (The haptic interface device may itself be shaped and sized like a paintbrush, pencil, pen or other painting or drawing implement.) A virtual painting or drawing implement moves within a two-dimensional virtual space in accordance with the movements of the haptic interface device over the drawing surface. As the haptic interface device moves over the drawing surface, haptic sensation is provided to the user in accordance with a characteristic of the image at the location of the haptic interface device within the image. The image characteristic can be, for example, the color of the image or the texture of the medium (for convenience, referred to hereinafter as the "image medium") used to create the image (e.g., type of paint or drawing ink). For instance, a force (for convenience, referred to hereinafter as the "haptic display force") can be applied to the haptic interface device, resisting motion of the haptic interface device, that increases as the color of the image becomes darker or as the image medium becomes more viscous. The force can be applied in two orthogonal dimensions that are parallel to the drawing surface. In accordance with the invention, the haptic interface device can be implemented with force sensors that sense the magnitude of force (for convenience, referred to hereinafter as the "resolution control force") with which the user is pressing the haptic interface device against the drawing surface. As the resolution control force changes, the amount of change in color or image medium viscosity required to produce a particular change in haptic display force changes in accordance with the change in the resolution control force. For example, the haptic interface device can be implemented so that, as the resolution control force increases, relatively smaller changes in color or image medium viscosity are required to produce the same change in haptic display force.

A haptic interface device in accordance with the invention can also be used for applications in which visual information (e.g., a visual image) is being presented haptically to a person who is blind or has severely impaired vision. Such a haptic interface device produces haptic sensations that convey the content of the visual information in accordance with an appropriate haptic model. For example, a haptic interface device of this type can be moved by a user in two dimensions over a surface (for convenience, referred to hereinafter as the "image surface") that represents a space within which the boundaries of an image exist. Haptic sensations are produced by the haptic interface device that indicate the presence of particular content in the image. For example, the haptic model can be implemented so that the presence of a person in the image results in the production by the haptic interface device of the sensation of a bump (which can be produced by applying force of appropriate magnitude and duration, along two orthogonal axes parallel to the image surface, to the haptic interface device) when the haptic interface device passes over a boundary defining the person in the image as the user passes the haptic interface device over the image surface. Upon identifying the presence of a person in the image, the user can supply an appropriate input that increases the resolution of the haptic interface device (e.g., the user can apply a force of increasing magnitude to the image surface). As the resolution is increased, particular features of the person's body (e.g., facial features) become perceptible to the user (i.e., result in the production of a particular haptic sensation by the haptic interface device as the haptic interface device passes over those features in the image).

A haptic interface device in accordance with the invention can also be used in a similar manner for applications in which the user interacts with a volumetric data set (i.e., a three-dimensional representation of something such as a physical object). A haptic interface device can be used to navigate in three-dimensions around the space represented by the volumetric data set and provide haptic sensations (which can also be in three-dimensions) corresponding to characteristics of part of the volumetric data set with which the user is interacting. For example, there are a variety of medical simulation applications in which a volumetric data set is used to model some part or all of the human body. A haptic interface device can be used to navigate about the modeled part of the body and provide haptic sensations (such as compliance, inertia or texture) corresponding to characteristics (such as change in thickness or hardness of skin) of the modeled part of the body with which the user is interacting. The invention enables the resolution of such a haptic interface device to be varied by the user as the user navigates about the modeled part of the body, so that, if the user encounters something of interest at a particular location, the user can begin to navigate around that location at an increased level of granularity, thus enabling heightened scrutiny of that part of the modeled part of the body. Since the haptic interface device can be moved in any of three dimensions to navigate the volumetric data set, it may be necessary to provide for resolution control that is effected other than by applying force and/or motion in one of those directions: for example, the haptic interface device can include a pushbutton or a squeezable handle that, when depressed, changes the haptic resolution at a predetermined rate.

A haptic interface device in accordance with the invention can also be used to browse voicemail (or, more generally, any set of audio data). A user interacts with the haptic interface device to cause stored voicemail messages to be played back to the user. Haptic sensation is provided to the user as the voicemail messages are played back (e.g., a simulated detent can be provided at the beginning of each message). The user can interact with the haptic interface device to provide a resolution control input that establishes the speed at which messages are played back. The haptic sensation can facilitate the user's review of the voicemail. For example, the use of simulated detents as described above can enable the user to move through the messages at a high speed until the beginning of message is encountered, then slow the playback speed so that the user can ascertain the content of the message (and decide whether to continue to listen to the message). This application of the invention can be particularly advantageously used to enable browsing of voicemail from a remote location, since the presence of the haptic display can enable the user to more quickly and efficiently browse voicemail, thus reducing communication time to the remote location and/or data transfer from the remote location (and, therefore, the cost of the remote access).

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A haptic interface device, comprising:
   haptic display means for providing a haptic sensation to a user in response to an interaction with an environment by the user;
   resolution control means for receiving a resolution control input from the user; and
   means for varying the resolution of the haptic sensation in response to the resolution control input;
   wherein the resolution control means is configured to receive a resolution control input from the user during, and without necessarily interrupting, the user's ongoing interaction with the environment, and the means for varying the resolution is configured to vary the resolution of the haptic sensation in real time during the user's ongoing interaction with the environment.

2. A haptic interface device as in claim 1, wherein the means for varying the resolution of the haptic sensation further comprises means for continuously varying the resolution of the haptic sensation.

3. A haptic interface device as in claim 1, wherein the means for varying the resolution of the haptic sensation further comprises means for selecting one of a plurality of discrete resolutions of the haptic sensation.

4. A haptic interface device as in claim 1, further comprising environment interaction control means for enabling the user to interact with the environment.

5. A haptic interface device as in claim 4, wherein the user interacts with the environment interaction control means and the resolution control means using the same apparatus.

6. A haptic interface device as in claim 5, wherein the user interacts with the environment interaction control means, the resolution control means, and the haptic display means using the same apparatus.

7. A haptic interface device as in claim 5, wherein the apparatus further comprises:
   means for sensing a force applied by a user to, and/or a position of, the apparatus along a first axis, such force and/or position producing corresponding environment interaction control; and
   means for sensing a force applied by a user to, and/or a position of, the apparatus along a second axis that is different from the first axis, such force and/or position producing corresponding resolution control.

8. A haptic interface device as in claim 1, wherein the user interacts with the resolution control means and the haptic display means using the same apparatus.

9. A haptic interface device as in claim 8, wherein the apparatus further comprises:
   means for sensing a force applied to a user by the apparatus along a first axis, such force producing corresponding haptic sensation; and
   means for sensing a force applied by a user to, and/or a position of, the apparatus along a second axis that is different from the first axis, such force and/or position producing corresponding resolution control.

10. A haptic interface device as in claim 1, wherein:
    the haptic display means further comprises means for simulating a plurality of detents, each detent corresponding to a state of one or more aspects of the environment; and
    the means for varying the resolution of the haptic sensation further comprises means for varying the number of detents per unit change in the state of one or more aspects of the environment.

11. A haptic interface device as in claim 10, wherein:
    the environment is a visual recording including a plurality of related sets of visual recording data;
    the haptic display means further comprises means for identifying the occurrence of a transition from one related set of visual recording data to another related set of visual recording data, wherein the means for simulating a plurality of detents simulates a detent during each of a plurality of transitions from one related set of visual recording data to another related set of visual recording data; and
    the means for varying the resolution of the haptic sensation further comprises means for varying the number of transitions at which a detent is simulated.

12. A haptic interface device as in claim 1, wherein the resolution control means further comprises means for sensing a force applied by a user to the resolution control means.

13. A haptic interface device as in claim 1, wherein the resolution control means further comprises means for sensing a position of the resolution control means.

14. A haptic interface device as in claim 1, wherein the resolution control means is adapted to receive a single degree of freedom user input.

15. A haptic interface device as in claim 1, wherein the resolution control means is adapted to receive a multiple degree of freedom user input.

16. A haptic interface device as in claim 1, wherein the resolution control means is adapted to receive a translational user input.

17. A haptic interface device as in claim 1, wherein the resolution control means is adapted to receive a rotational user input.

18. A haptic interface device as in claim 1, wherein the haptic display means is adapted to provide a single degree of freedom haptic output.

19. A haptic interface device as in claim 1, wherein the haptic display means is adapted to provide a multiple degree of freedom haptic output.

20. A haptic interface device as in claim 1, wherein the haptic display means is adapted to provide a translational haptic output.

21. A haptic interface device as in claim 1, wherein the haptic display means is adapted to provide a rotational haptic output.

22. A haptic interface device as in claim 1, wherein the environment interaction control means is adapted to receive a single degree of freedom user input.

23. A haptic interface device as in claim 1, wherein the environment interaction control means is adapted to receive a multiple degree of freedom user input.

24. A haptic interface device as in claim 1, wherein the environment interaction control means is adapted to receive a translational user input.

25. A haptic interface device as in claim 1, wherein the environment interaction control means is adapted to receive a rotational user input.

26. A haptic interface device, comprising:
    haptic display means for providing a haptic sensation to a user in response to an interaction with an environment by the user; and
    means for continuously varying the resolution of the haptic sensation during at least part of the time that the user interacts with the environment;
    wherein the means for continuously varying the resolution is configured to vary the resolution of the haptic sensation in real time during the user's ongoing interaction with the environment.

27. A method for providing a haptic interface to an environment, comprising the steps of:
    providing a haptic sensation to a user in response to an interaction with the environment by the user;
    receiving a resolution control input from the user during, and without necessarily interrupting, the user's ongoing interaction with the environment; and
    varying the resolution of the haptic sensation in response to the resolution control input in real time during the user's ongoing interaction with the environment.

28. A method as in claim 27, wherein the step of varying the resolution of the haptic sensation further comprises the step of continuous varying the resolution of the haptic sensation.

29. A method as in claim 27, further comprising the step of enabling the user to interact with the environment, and wherein the step of enabling the user to interact with the environment and the step of receiving a resolution control input from the user are performed using the same apparatus.

30. A method as in claim 29, wherein the step of enabling the user to interact with the environment, the step of receiving a resolution control input from the user, and the step of providing a haptic sensation to the user are performed using the same apparatus.

31. A method as in claim 29, further comprising the steps of:
    sensing a force applied by a user to, and/or a position of, the apparatus along a first axis, such force and/or position producing corresponding environment interaction control; and sensing a force applied by a user to, and/or a position of, the apparatus along a second axis that is different from the first axis, such force and/or position producing corresponding resolution control.

32. A method as in claim 27, wherein the step of receiving a resolution control input from the user and the step of providing a haptic sensation to the user are performed using the same apparatus.

33. A method as in claim 32, further comprising the steps of:

sensing a force applied to a user by the apparatus along a first axis, such force producing corresponding haptic sensation; and sensing a force applied by a user to, and/or a position of, the apparatus along a second axis that is different from the first axis, such force and/or position producing corresponding resolution control.

34. A method as in claim 27, wherein the step of receiving a resolution control input further comprises the step of sensing a force applied by a user to a resolution control means.

35. A method as in claim 27, wherein the step of receiving a resolution control input further comprises the step of sensing a position of a resolution control means.

* * * * *